(12) United States Patent
Braden

(10) Patent No.: US 9,120,498 B1
(45) Date of Patent: Sep. 1, 2015

(54) LOG HANDLING ASSEMBLY

(71) Applicant: Eugene B. Braden, Lebanon Junction, KY (US)

(72) Inventor: Eugene B. Braden, Lebanon Junction, KY (US)

( * ) Notice: Subject to any disclaimer, the term of this patent is extended or adjusted under 35 U.S.C. 154(b) by 0 days.

(21) Appl. No.: 14/190,282

(22) Filed: Feb. 26, 2014

(51) Int. Cl.
*B62B 1/14* (2006.01)

(52) U.S. Cl.
CPC ........................................ *B62B 1/14* (2013.01)

(58) Field of Classification Search
CPC .......... B62B 1/264; B62B 1/14; B62B 1/142; B62B 2202/02
USPC ........................... 414/444, 450–454, 457, 490
See application file for complete search history.

(56) References Cited

U.S. PATENT DOCUMENTS

| | | | |
|---|---|---|---|
| 2,693,935 A | 11/1954 | Halbert | |
| 3,477,598 A * | 11/1969 | Hassell et al. | 414/452 |
| D264,572 S | 5/1982 | Lowry | |
| 4,368,874 A | 1/1983 | Weisgerber | |
| 4,375,935 A * | 3/1983 | Miller | 414/454 |
| 4,583,904 A * | 4/1986 | Maxwell | 414/453 |
| 4,637,769 A * | 1/1987 | Thorndike | 414/454 |
| 4,729,711 A * | 3/1988 | Holopainen | 414/454 |
| 5,017,080 A * | 5/1991 | Thorndike et al. | 414/454 |
| 5,174,549 A | 12/1992 | Driver | |
| 5,419,569 A * | 5/1995 | Walla | 280/47.27 |
| 6,022,032 A | 2/2000 | Savage | |
| 6,086,310 A * | 7/2000 | Lujan et al. | 414/444 |
| 2012/0248721 A1 | 10/2012 | Dean | |

* cited by examiner

*Primary Examiner* — Saul Rodriguez
*Assistant Examiner* — Emery Hassan

(57) ABSTRACT

A log handling assembly includes a cart that is positionable on the support surface. A wheel is operationally coupled to the cart. The wheel engages the support surface. A restraining jaw is coupled to the cart. The restraining jaw may engage the log. A handle is coupled to the cart. The handle is gripped by a user. The user urges the handle upwardly. The cart is tipped forwardly so retraining jaw engages the log. A gripping jaw is operationally coupled to the cart. A lever is operationally coupled to the cart. The lever is operationally coupled to the gripping jaw. The user urges the lever. The lever urges the gripping jaw so the gripping jaw engages the log. The gripping jaw retains the log between the gripping jaw and the restraining jaw. The cart is movable along the support surface so the log may be transported.

8 Claims, 5 Drawing Sheets

LOG HANDLING ASSEMBLY

BACKGROUND OF THE DISCLOSURE

Field of the Disclosure

The disclosure relates to log handling devices and more particularly pertains to a new log handling device for grabbing a log from a support surface so the log is transportable.

SUMMARY OF THE DISCLOSURE

An embodiment of the disclosure meets the needs presented above by generally comprising a cart that is positionable on the support surface. A wheel is operationally coupled to the cart. The wheel engages the support surface. The cart is rolled along the support surface. A restraining jaw is coupled to the cart. The restraining jaw may engage the log. A handle is coupled to the cart. The handle is gripped by a user. The user urges the handle upwardly. The cart is tipped forwardly so retraining jaw engages the log. A gripping jaw is operationally coupled to the cart. A lever is operationally coupled to the cart. The lever is operationally coupled to the gripping jaw. The user urges the lever. The lever urges the gripping jaw so the gripping jaw engages the log. The gripping jaw retains the log between the gripping jaw and the restraining jaw. The cart is movable along the support surface so the log may be transported.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
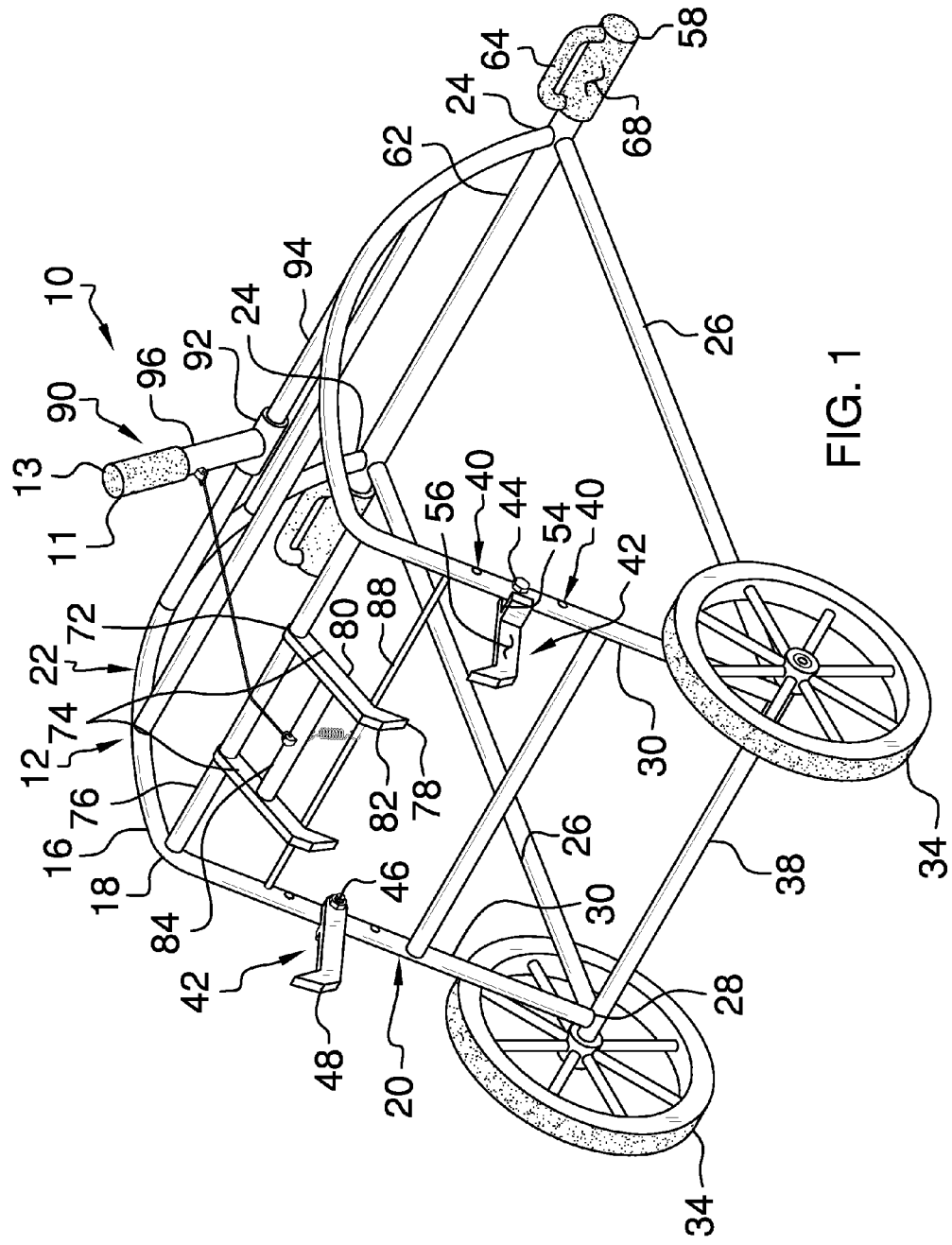
FIG. 1 is a perspective view of a log handling assembly according to an embodiment of the disclosure.
Figure 2:
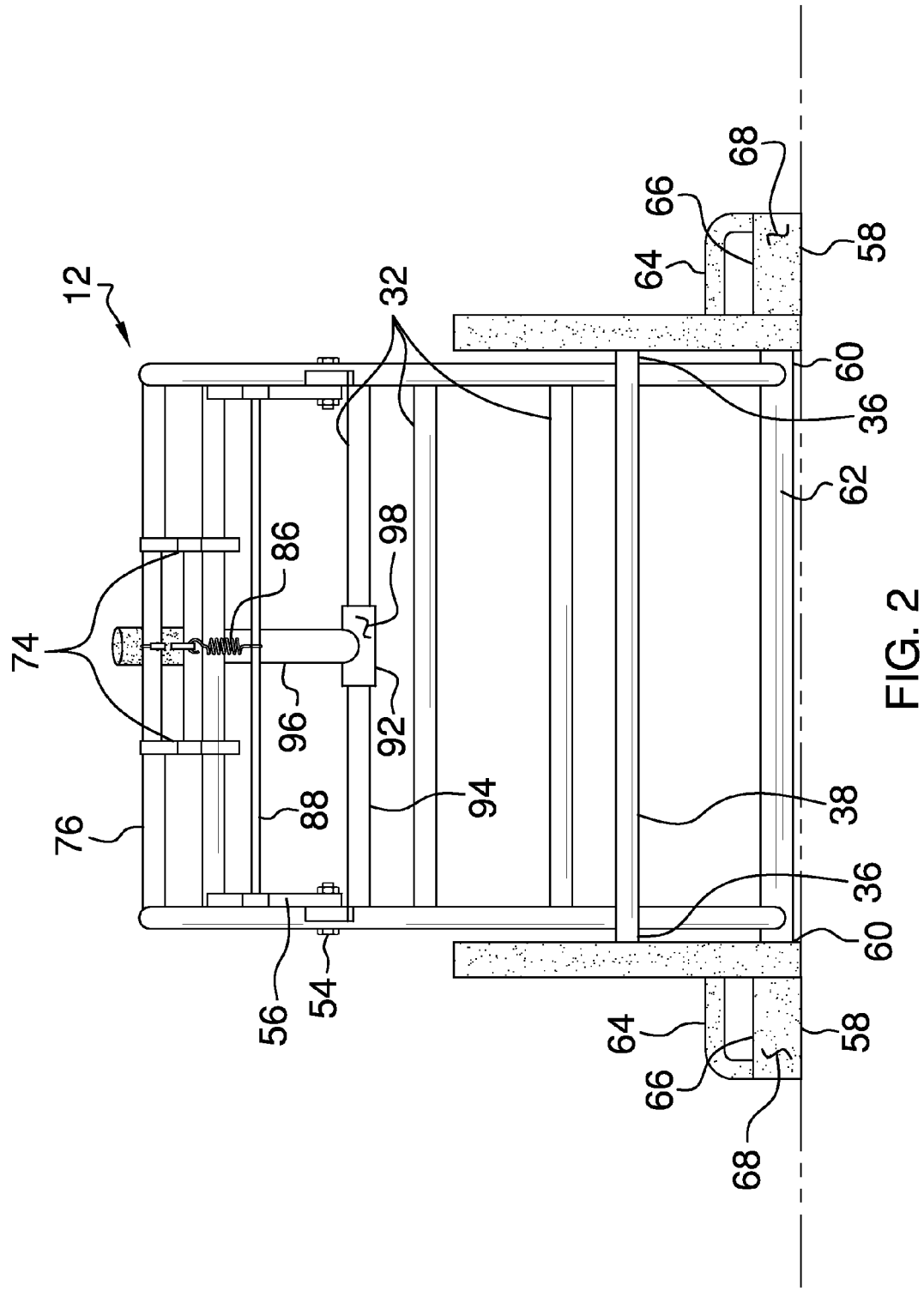
FIG. 2 is a front view of an embodiment of the disclosure.
Figure 3:
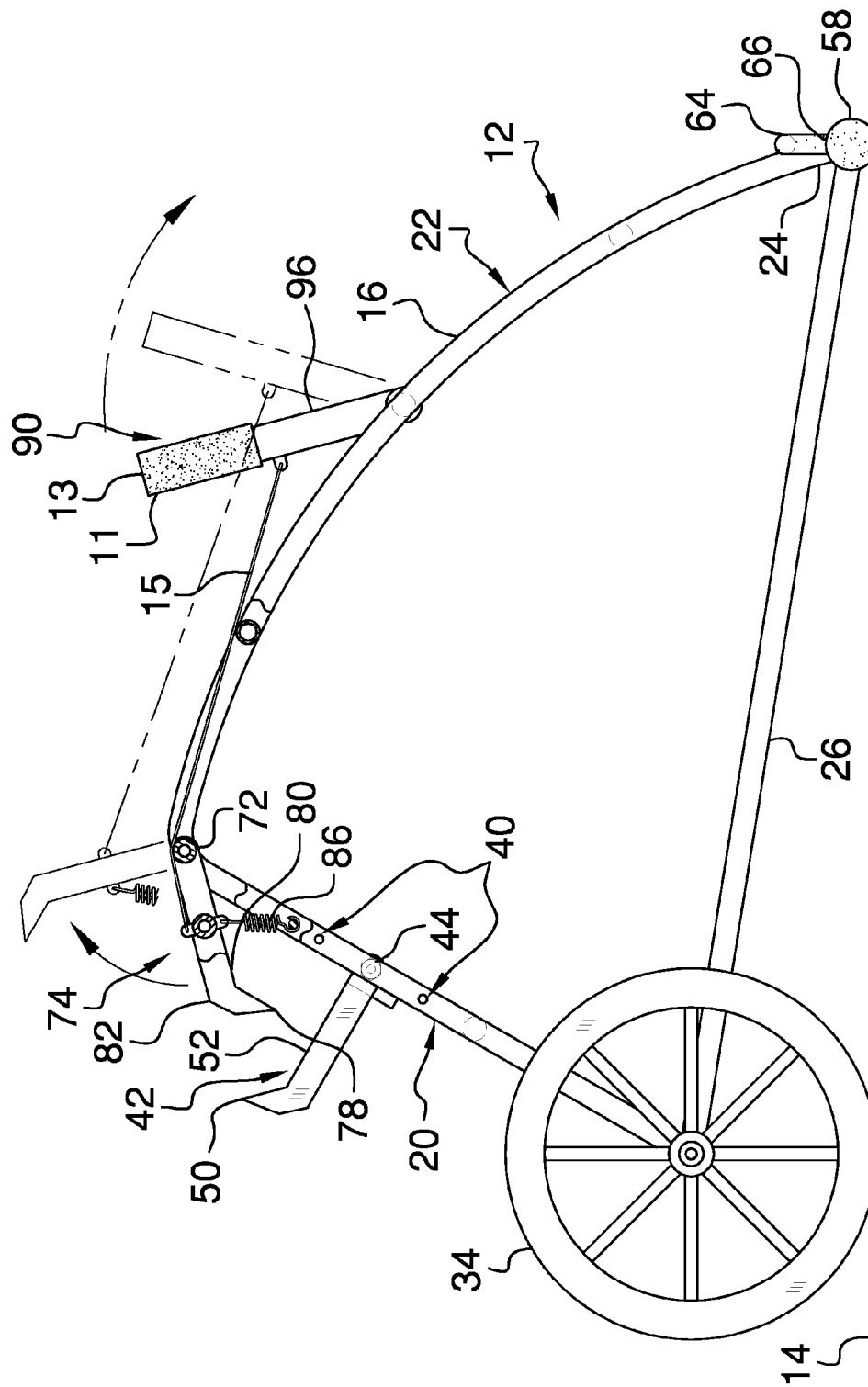
FIG. 3 is a left side cut-away view of an embodiment of the disclosure.
Figure 4:
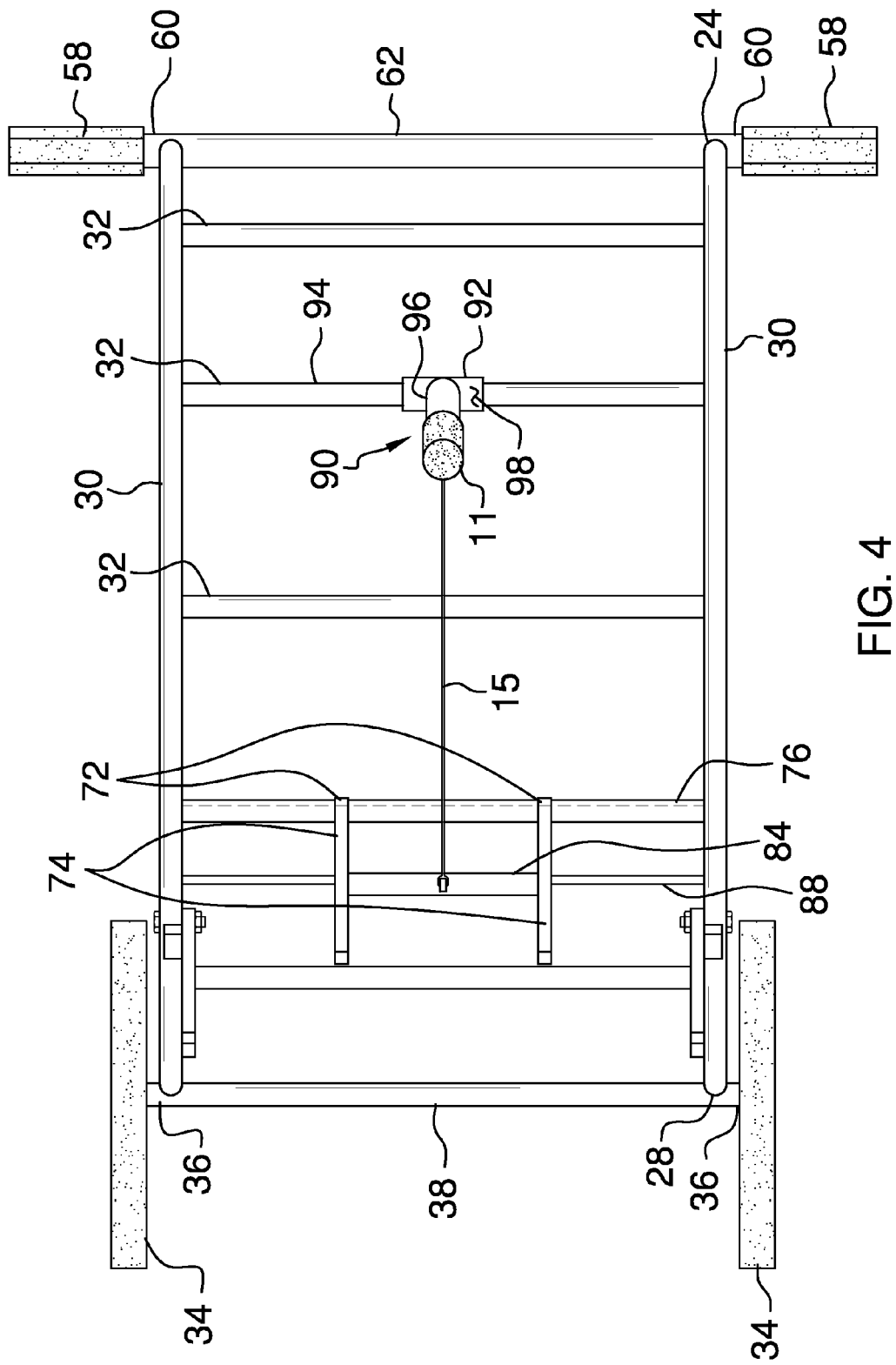
FIG. 4 is a top view of an embodiment of the disclosure.
Figure 5:
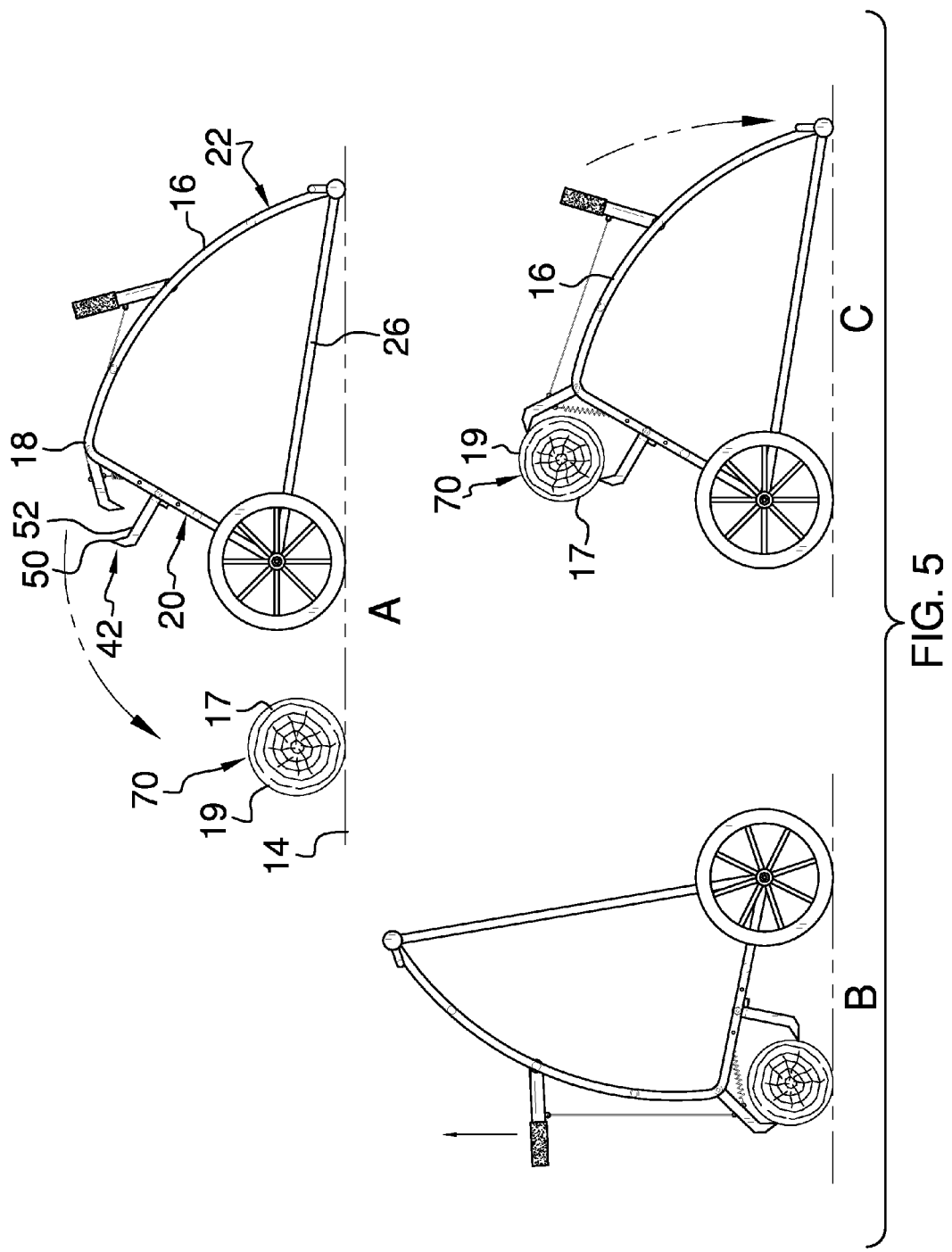
FIG. 5 is an in-use view of an embodiment of the disclosure.

With reference now to the drawings, and in particular to FIGS. 1 through 5 thereof, a new log handling device embodying the principles and concepts of an embodiment of the disclosure and generally designated by the reference numeral 10 will be described.

As best illustrated in FIGS. 1 through 5, the log handling assembly 10 generally comprises a cart 12 that is positionable on a support surface 14. The support surface 14 may be ground. The cart 12 comprises a primary arm 16 that has a bend 18 on the primary arm 16. The bend 18 defines a front portion 20 and a rear portion 22 of the primary arm 16.

The rear portion 22 of the primary arm 16 is curved between a handle end 24 of the rear portion 22 of the primary arm 16 and the bend 18. Moreover, the rear portion 22 of the primary arm 16 defines an arc of a circle. The front portion 20 of the primary arm 16 extends downwardly from the bend 18. The primary arm 16 defines a fin shape that may have a length between 130 cm and 165 cm and a height between 75 cm and 105 cm. A longitudinal member 26 is coupled to and extends between the handle end 24 of the rear portion 22 of the primary arm 16 and a wheel end 28 of the front portion 20 of the primary arm 12. The primary arm 12 is one of a pair of the primary arms 30.

A plurality of lateral members 32 of the cart 12 is coupled between each of the pair of primary arms 30 of the cart 12. Each of the plurality of lateral members 32 may have a length between 75 cm and 105 cm. The pair of primary arms 30 of the cart 12 are spaced laterally apart. The plurality of lateral members 32 of the cart 12 is evenly spaced apart and are distributed between the handle end 24 of the rear portion 22 of the pair of primary arms 30 of the cart 12 and the wheel end 28 of the front portion 20 of the pair of primary arms 30 of the cart 12.

A pair of wheels 34 are each rotatably coupled to opposing ends 36 of a wheel one of the plurality of lateral members 38 of the cart 12. Each of the opposing ends 36 of the wheel lateral arm 38 extends beyond the associated one of the pair of primary arms 30 of the cart 12. The pair of wheels 34 are positioned proximate the wheel end 28 of an associated one of the pair of primary arms 30 of the cart 12. Each of the pair of wheels 34 may be a spoked wheel of any conventional design. The pair of wheels 34 each engages the support surface 14 so the cart 12 is rolled along the support surface 14.

A plurality of fastener apertures 40 extends laterally through the front portion 20 of each of the pair of primary arms 30 of the cart 12. The plurality of fastener apertures 40 are centrally positioned on the front portion 20 of each of the pair of primary arms 30 of the cart 12. A pair of restraining jaws 42 are provided. A fastener 44 extends through a fastened end 46 of each of the pair of restraining jaws 42 and engages a selected one of the plurality of fastener apertures 40. The fastener 44 may be a nut and bolt of any conventional design.

The pair of restraining jaws 42 are each elongated between the fastened end 46 and a free end 48 of each of the pair of restraining jaws 42. A tooth 50 extends upwardly from a top edge 52 of each of the pair of restraining jaws 42. The tooth 50 is positioned proximate the free end 48 of each of the pair of restraining jaws 42. A tab 54 is coupled to and extends laterally away from a first oblique surface 56 of each of the pair of restraining jaws 42. The tab 54 abuts the associated one of the pair of primary arms 30 of the cart 12 so the pair of restraining jaws 42 each extends forwardly from the cart 12.

A pair of handles 58 is each coupled to opposite ends 60 of a handle one of the plurality of lateral members 62 of the cart 12. Each of the opposite ends 60 of the handle lateral arm 62 extends beyond the associated one of the pair of primary arms 30 of the cart 12. The pair of handles 58 are positioned proximate the handle end 24 of an associated one of the pair of primary arms 30 of the cart 12. A U-shaped grip 64 is coupled to and extends upwardly from a top side 66 of each of the pair of handles 58. The handle lateral member 62 abuts the support surface 14 when the cart 12 is stationary.

An outside surface 68 of each of the pair of handles 58 and the pair of U-shaped grips 64 are textured. A user may grip either of the U-shaped grips 64 or the pair handles 58 themselves. The user urges the pair of handles 58 upwardly. The cart 12 is tipped forwardly so the pair of retraining jaws 42 engages a log 70.

A connected end 72 of each of a pair of gripping jaws 74 is movably coupled to a gripping one of the plurality of lateral arms 76 of the cart 12. A tooth 78 extends downwardly from a bottom edge 80 of each of the pair of gripping jaws 74. The tooth 78 is positioned proximate an engaging end 82 of each of the pair of gripping jaws 74. The pair of gripping jaws 74 are spaced laterally away from a center of the gripping lateral arm 76 of the cart 12.

An urging member 84 is coupled to and extends between each of the pair of gripping jaws 74. The urging member 84 is centrally positioned on each of the pair of gripping jaws 74. The gripping lateral arm 76 of the cart 12 is positioned proximate the bend 18 on each of the pair of primary arms 30 of the cart 12. The pair of gripping jaws 74 are positioned upwardly from the pair of the restraining jaws 42. Moreover, each of the pair of gripping jaws 74 is spaced inwardly from an associated one of the pair of restraining jaws 42.

A spring biasing member 86 is coupled between the urging member 84 and a support one of the plurality of lateral members 88 of the cart 12. The spring biasing member 86 biases the pair of gripping jaws 74 into a gripping position. Each of the pair of gripping jaws 74 rotates downwardly toward the pair of restraining jaws 42 when the pair of gripping jaws 74 is in the gripping position.

A lever 90 is provided. The lever 90 includes a tubular member 92. The tubular member 92 has a lever one of a plurality of lateral members 94 of the cart 12 extending therethrough. The tubular member 92 is rotatably coupled to the lever lateral member 94 of the cart 12. Additionally, the tubular member 92 is centrally positioned on the lever lateral member 94 of the cart 12.

A gripping member 96 is coupled to and extends laterally away from an outer surface 98 of the tubular member 92. The gripping member 96 may be gripped by the user. A textured pad 11 extends downwardly from an upper end 13 of the gripping member 96. A cable 15 is coupled between the gripping member 96 and the pair of gripping jaws 74. The lever 90 urges the pair of gripping jaws 74 between the gripping position and a releasing position. The pair of gripping jaws 74 rotates upwardly away from the pair of restraining jaws 42 when the pair of gripping jaws 74 are positioned in the releasing position.

In use, the user moves the lever 90 so the pair of gripping jaws 74 is urged into the releasing position. The user tips the cart 12 forwardly so the pair of restraining jaws 42 each engages a back side 17 of the log 70. The user releases the lever 90 so the pair of the gripping jaws 74 each moves into the gripping position and engages a front side 19 of the log 70. The pair of gripping jaws 74 retains the log 70 between the pair of gripping jaws 74 and the pair of restraining jaws 42. The log 70 is positioned at a height that allows the user to cut the log 70 without the need to bend over. The cart 12 is rolled along the support surface so the log 70 may be transported.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A log handling assembly configured to grab a log from a support surface such that the log is transportable, said assembly comprising:
    a cart being positionable on the support surface, said cart including a pair of primary arms, each of said primary arms having a bend therein such that said bend defines a front portion and a rear portion of each said primary arm, said rear portion of each said primary arm being curved between a handle end of said rear portion and said bend such that said rear portion of each said primary arm defines an arc of a circle, said front portion of each said primary arm extending downwardly from said bend such that each said primary arm defines a fin shape, said cart further including a pair of longitudinal members, each longitudinal member being coupled to and extending between said handle end and a wheel end of said front portion of a respective one of said primary arms, said primary arms being positioned in spaced parallel relationship to each other;
    a pair of wheels, each said wheel being operationally coupled to said cart adjacent to a respective one of said wheel ends of said rear portions of said primary arms;
    a pair of restraining jaws coupled to said cart, each said restraining jaw being coupled to an associated one of said rear portions of said primary arms wherein each said restraining jaw is configured to engage the log;
    a handle coupled to said cart such that-said handle is configured to be gripped by a user to urge said handle upwardly such that said cart is tipped forwardly having said retraining jaw engaging the log;
    a gripping jaw pivotally coupled to said cart, said gripping jaw being positioned laterally spaced between said restraining jaws; and
    a lever coupled to said cart, said lever being operationally coupled to said gripping jaw such that such that manipulation of said lever urges said gripping jaw to be moved relative to said restraining jaws wherein said gripping jaw is configured to engage the log such that the log is retained between said gripping jaw and said restraining jaws.

2. The assembly according to claim 1, wherein said cart further comprises a plurality of lateral members coupled to and extending between said primary arms of said cart.

3. The assembly according to claim 2, further comprising said plurality of lateral members of said cart being evenly spaced apart and distributed between said handle end and said wheel end of said primary arms of said cart.

4. The assembly according to claim 1, further comprising said handle being one of a pair of said handles, each said handle being coupled to and extending laterally outward relative to said handle end of an associated one of said primary arms of said cart.

5. The assembly according to claim 1, wherein said gripping jaw being one of a pair of said gripping jaws, said gripping jaws being parallel and spaced apart, each of said gripping jaws being equidistant from an associated one of said primary arms wherein said gripping jaws are inset relative to said restraining jaws.

6. The assembly according to claim 5, further comprising each of said gripping jaws being pivotable relative to an axis extending between said bends of said primary arms of said cart such that said pair of gripping jaws are positioned upwardly from said pair of said restraining jaws.

7. The assembly according to claim 5, further comprising a cable being coupled between said lever and said pair of gripping jaws such that pivoting of said lever urges said pair of gripping jaws between a gripping position and a releasing position.

8. A log handling assembly configured to grab a log from a support surface such that the log is transportable, said assembly comprising:

a cart being positionable on the support surface, said cart including a pair of primary arms, each of said primary arms having a bend therein such that said bend defines a front portion and a rear portion of each said primary arm, said rear portion of each said primary arm being curved between a handle end of said rear portion and said bend such that said rear portion of each said primary arm defines an arc of a circle, said front portion of each said primary arm extending downwardly from said bend such that each said primary arm defines a fin shape, said cart further including a pair of longitudinal members, each longitudinal member being coupled to and extending between said handle end and a wheel end of said front portion of a respective one of said primary arms, said primary arms being positioned in spaced parallel relationship to each other, said cart further comprises a plurality of lateral members coupled to and extending between said primary arms of said cart, said plurality of lateral members of said cart being evenly spaced apart and distributed between said handle end and said wheel end of said primary arms of said cart;

a pair of wheels, each said wheel being operationally coupled to said cart adjacent to a respective one of said wheel ends of said rear portions of said primary arms;

a pair of restraining jaws coupled to said cart, each said restraining jaw being coupled to an associated one of said rear portions of said primary arms wherein each said restraining jaw is configured to engage the log;

a pair of handles coupled to said cart such that-each-said handle is configured to be gripped by a user to urge said handle upwardly such that said cart is tipped forwardly having said retraining jaw engaging the log, each said handle being coupled to and extending laterally outward relative to said handle end of an associated one of said primary arms of said cart;

a pair of gripping jaws pivotally coupled to said cart, said gripping jaws being positioned laterally spaced between said restraining jaws, said gripping jaws being parallel and spaced apart form each other, each of said gripping jaws being equidistant from an associated one of said primary arms wherein said gripping jaws are inset relative to said restraining jaws, each of said gripping jaws being pivotable relative to an axis extending between said bends of said primary arms of said cart such that said pair of gripping jaws are positioned upwardly from said pair of said restraining jaws;

a lever coupled to said cart, said lever being operationally coupled to said gripping jaw such that manipulation of said lever urges said gripping jaw to be moved relative to said restraining jaws wherein said gripping jaw is configured to engage the log such that the log is retained between said gripping jaw and said restraining jaws; and a cable being coupled between said lever and said pair of gripping jaws such that pivoting of said lever urges said pair of gripping jaws between a gripping position and a releasing position.

\* \* \* \* \*